W. E. & P. ROWLANDS.
CHANGE SPEED CONE AND PULLEY.
APPLICATION FILED JAN. 20, 1908.

944,636.

Patented Dec. 28, 1909.

2 SHEETS—SHEET 1.

WITNESSES:
C. R. Stickney.
A. M. Dow.

INVENTORS:
William Ellison Rowlands
Percy Rowlands
By
Attorneys.

W. E. & P. ROWLANDS.
CHANGE SPEED CONE AND PULLEY.
APPLICATION FILED JAN. 20, 1908.

944,636.

Patented Dec. 28, 1909.
2 SHEETS—SHEET 2.

WITNESSES:

INVENTORS:
William Ellison Rowlands.
Percy Rowlands
By
Attorneys

UNITED STATES PATENT OFFICE.

WILLIAM ELLISON ROWLANDS AND PERCY ROWLANDS, OF LIVERPOOL, ENGLAND.

CHANGE-SPEED CONE AND PULLEY.

944,636.  Specification of Letters Patent.  Patented Dec. 28, 1909.

Application filed January 20, 1908. Serial No. 411,816.

*To all whom it may concern:*

Be it known that we, WILLIAM ELLISON ROWLANDS and PERCY ROWLANDS, subjects of the King of England, residing at 30 Falkner Square, city of Liverpool, county of Lancaster, England, have invented new and useful Improvements in and Relating to Change-Speed Cones and Pulleys, of which the following is a specification.

This invention relates to certain improvements in the construction of conical or stepped pulleys employed in connection with belt or rope driving gear, the function of such cones or pulleys being to afford changes of speed accordingly as the belt or rope is adjusted to a smaller diameter upon the driving pulley and to a larger diameter upon the driven pulley, and vice versa, the chief object of such improvements being to render such adjustment possible without a stoppage of the machine.

Figure 1:
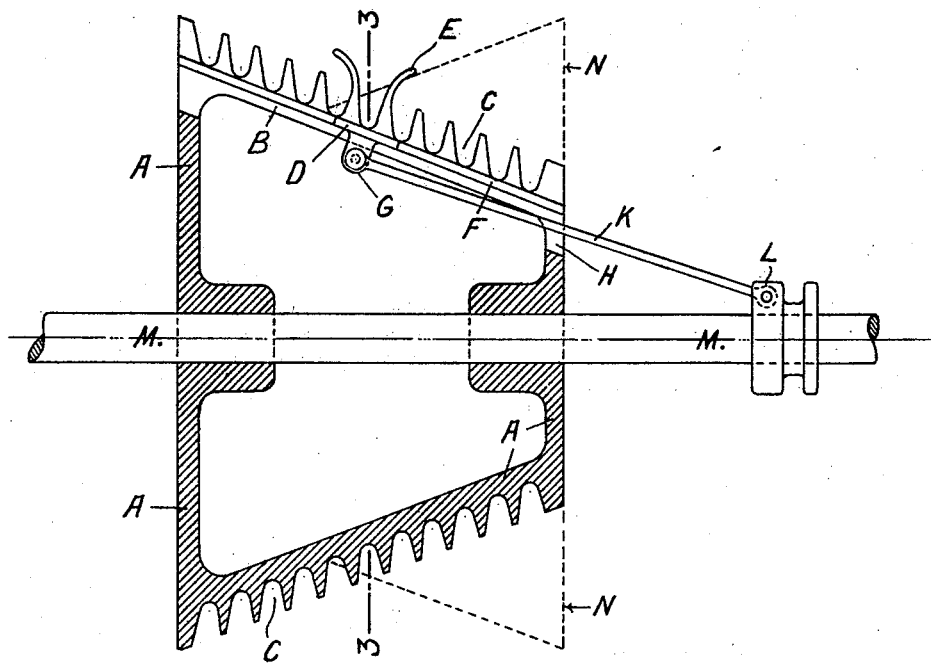
Figure 2:
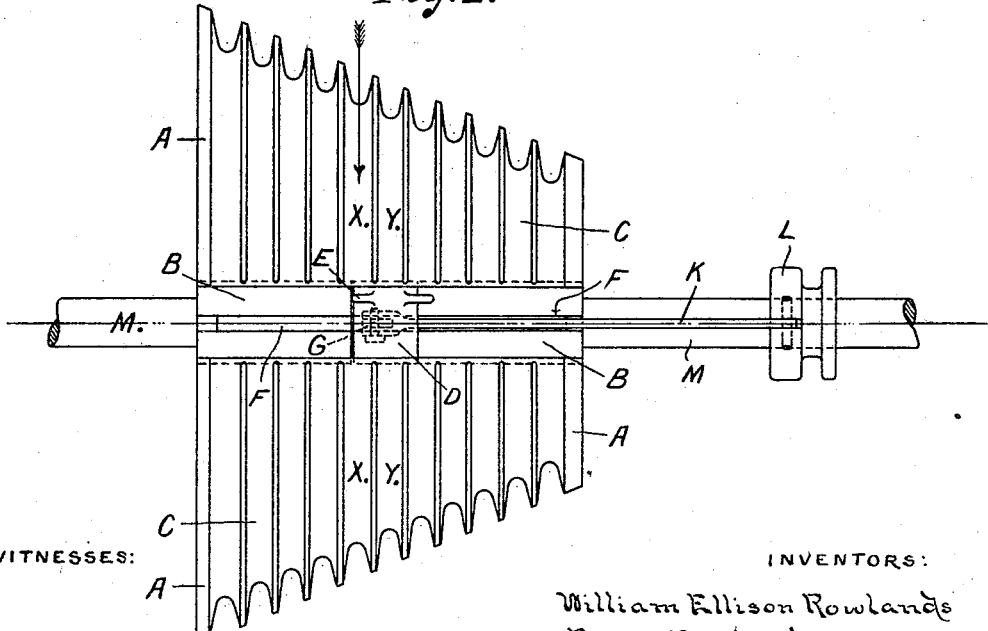
Figure 3:
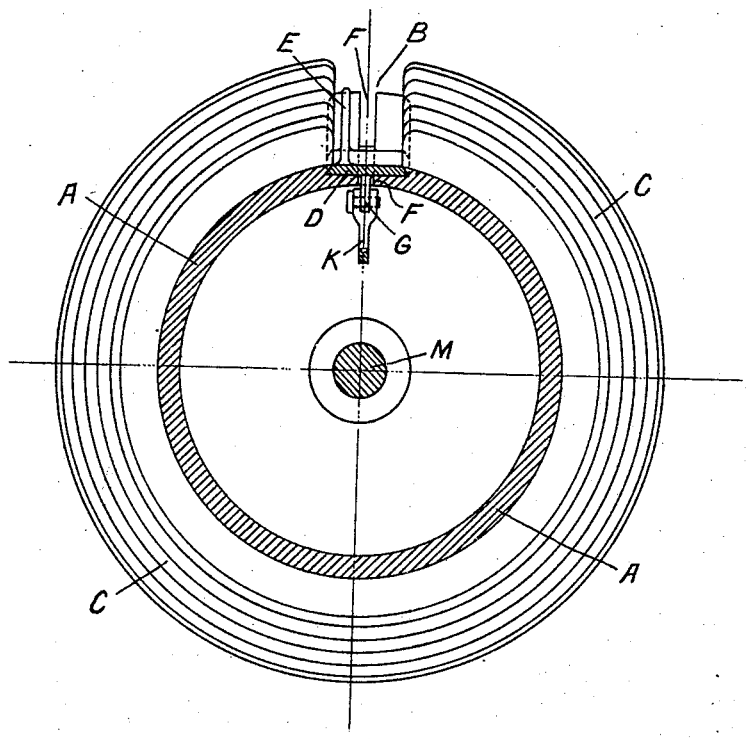

In the annexed drawing Figure 1 is a sectional elevation and Fig. 2 is a plan of a change speed pulley according to this invention, Fig. 3 being a cross section on line 3—3 Fig. 1.

The drawings illustrate the invention as applied to an ordinary grooved conical pulley, A, such as is employed in machine tools and other machinery in which it is necessary to regulate the speed of the motion which is transmitted from the power shaft to the driven shaft, and wherein it is desirable that such regulation or change of speed shall be effected without stopping the machine or machinery which is being actuated. For this purpose a gap or slot, B, is formed in the grooving C of the pulley, such gap or opening extending from end to end of the pulley. The function of this gap B is to permit of the driving belt or rope leaving the groove in which it has been running and being deflected to the next groove, that is, the groove on either side of the groove from which the belt is being deflected. That is to say, the gap or opening B provides a cross-over pathway for the belt to travel from one groove to a groove of either a larger or a smaller diameter. This deflection of the belt or rope from one groove to another may be effected by the ordinary belt-fork, but in order that such deflection may be effected instantly and without the wear and tear produced on the belt by such fork, a deflecting piece D is arranged to slide in the gap or slot B, such sliding piece D carrying a fork, E, the contour of which coincides with the grooving C of the pulley. The slot B and sliding piece D are dovetailed with one another as illustrated. For the purpose of shifting the sliding piece D from one groove to another, a slot, F is cut through the metal of the pulley, which slot receives the inwardly projecting eye G, of the piece D.

Connected to the eye G and passing out through the aperture H in one end of the pulley, is the connecting rod K, the other end of such rod being coupled to the grooved bobbin L, which latter rotates with but is free to slide lengthwise upon the shaft M, and this bobbin may be actuated in any well known manner. In order, however, that the shifting of the piece D and fork E of the driving and also of the driven pulley (which is indicated by dotted lines, N, in Fig. 1) may be effected synchronously, it is necessary that the bobbins L on both the driving and driven shafts should be geared with one another. Such gearing may take the form of a rack and pinion arrangement. For instance, the forks which engage the grooves in the bobbins L may possess toothed racks adapted to mesh with pinions upon a cross spindle: but other well known mechanical means may be employed for this purpose.

In operation, assuming the belt is running on to the pulley A in the direction indicated by the arrow in Fig. 2, and into the groove X, and that the piece D and fork E have been shifted to the next groove Y as shown, it will be seen that the fork E will—in rising on the running on side of the pulley—deflect the belt from its groove X so that it will be deflected across the gap B and will enter the groove Y with which the fork E is registering.

In order that the angle of deflection across the gap B may be as slight as possible, the fork E should be disposed on the rear or trailing side of such gap, as shown. Further, to overcome any weakening effect produced by the grooves or slots B and F in the rim of the pulley, the ends of the latter may not be integral with the rim, as shown, but be separate, and be formed with a dished rim or flange provided with an internal thread arranged to screw on to an external thread on the ends of the pulley rim.

When requisite, the pulley will be weighted to restore any unbalancing tendency caused by the application of the deflecting fork E and parts connected therewith.

Having now described our invention, what we claim as new, and desire to secure by Letters Patent is.

1. A grooved conical change speed pulley, having a gap provided in, and common to, the whole of the groovings, adapted to provide a cross over path for the driving belt or rope and means adapted to engage with and deflect the driving belt or rope from one groove to another.

2. A grooved conical change speed pulley, having a gap provided in, and common to, the whole of the groovings, adapted to provide a cross over path for the driving belt or rope; and a fork adapted to engage with and deflect the driving belt or rope from one groove to another.

3. A grooved conical change speed pulley, having a gap in the grooving thereof, adapted to provide a cross-over path for the driving belt or rope; a piece adapted to slide lengthwise in said gap; and a fork connected with said piece, adapted to engage with and deflect the driving belt or rope from one groove to another.

4. A grooved conical change speed pulley, having a gap in the grooving thereof, adapted to provide a cross-over path for the driving belt or rope; a piece adapted to slide lengthwise in said gap; a fork connected with said piece adapted to engage with and deflect the driving belt or rope from one groove to another; and means adapted to effect the displacement of said piece and fork while the pulley is in motion.

5. In combination, a grooved conical change speed pulley; having a gap in the grooving thereof, adapted to provide a cross-over path for the driving belt or rope; a fork connected with said piece; an inwardly projecting eye; a shaft upon which said pulley is mounted; a bobbin movable longitudinally on said shaft; and a rod, one end of which is connected with said eye, and the other end with said bobbin.

6. In combination, a grooved conical change speed pulley; having a gap in the grooving thereof, adapted to provide a cross-over path for the driving belt or rope; a fork connected with said piece; an inwardly projecting eye; said pulley having a slot adapted to receive said eye; a shaft upon which said pulley is mounted; a bobbin movable longitudinally on said shaft; a rod, one end of which is connected with said eye and the other end with said bobbin; and an aperture in said pulley through which said connecting rod is adapted to pass.

In testimony whereof we have signed our names to this specification in the presence of two subscribing witnesses.

WILLIAM ELLISON ROWLANDS.
PERCY ROWLANDS.

Witnesses:
JOHN HINDLEY WALKER,
EMILY BURNETT.